Jan. 1, 1929.

C. F. PERHAM

CULTIVATOR

Filed Aug. 1, 1922

1,697,572

Inventor
Charles F. Perham
by Leigh Brown Dunsby
Attys

Patented Jan. 1, 1929.

1,697,572

UNITED STATES PATENT OFFICE.

CHARLES F. PERHAM, OF TYNGSBORO, MASSACHUSETTS.

CULTIVATOR.

Application filed August 1, 1922. Serial No. 578,859.

This invention relates to cultivators and analogous devices, more particularly of the type designed for manual operation, and provides a construction by which a considerable width of ground is worked at each traverse in an accurate and thorough manner, a plurality of earth-working implements adjustable to conform to the spacing of various crops being employed.

It also provides a construction wherein the various groups of earth-working implements may adapt themselves to the configuration of the ground, and whereby the character of the operation may be adjusted as desired.

For a more complete understanding of this invention, together with further objects and advantageous details and combinations of parts, reference may be had to the accompanying drawings in which Figure 1 is a top plan of the cultivator.

Figure 1:
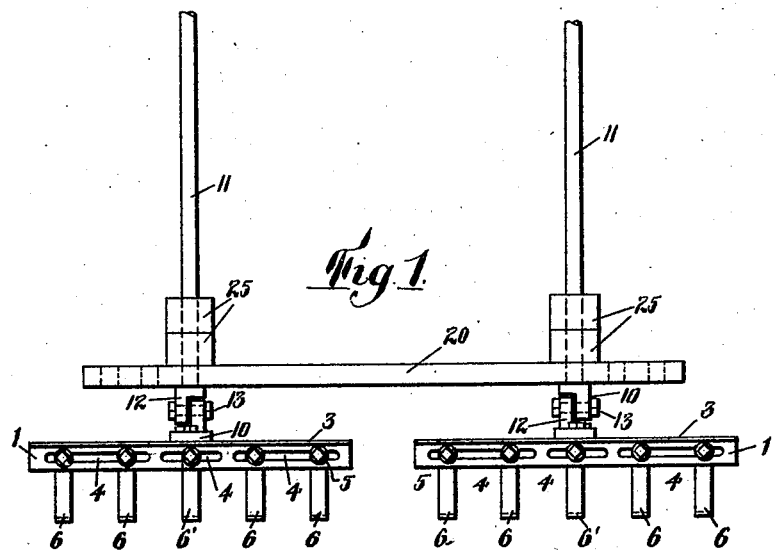
Figure 2:
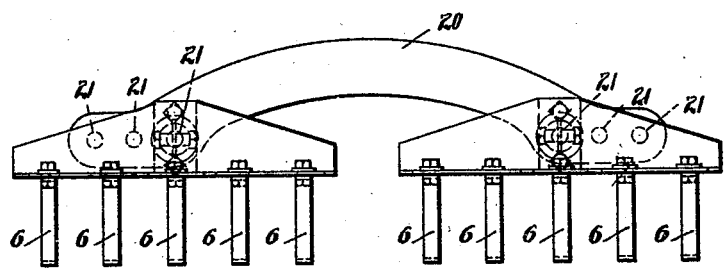
Figure 2 is a rear elevation thereof.

Referring to these drawings, 1 indicates each of a pair of implement-supporting bars angular in cross section, each bar having a substantially horizontal flange 2 and a vertical flange 3, the vertical flange, as shown, being considerably wider at its central portion than adjacent its ends. The flange 2 is provided with a series of longitudinally arranged slots 4 and in these slots are adapted to ride fastening bolts 5 at the upper ends of earth-working implements 6. As shown these implements are cultivator teeth, though other earth-working implements could be employed without departing from the scope of this invention. Any desired number of teeth or implements may be employed, depending upon the nature of the work to be done. As herein illustrated five are employed for each bar, these five forming groups which act more or less as units. The forward face of the flange 3 is shown as provided with a bracket 10 substantially centrally of its length to which is pivoted to move in a substantially vertical plane perpendicular to the length of the bar, the rear end of a traction pole 11.

Figure 3:
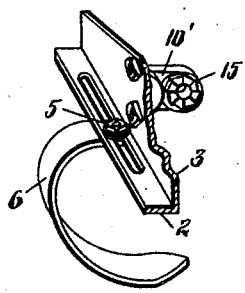
Figure 3 is a fragmentary detail in perspective showing one manner of attaching the cultivator teeth and a construction for attaching the traction pole.

In order that the angular relation of this pole to the earth-working implements may be adjusted, a leather washer may be interposed between the bracket 10 and the pivot member 12 of the pole through which the pivot bolt 13 passes. By tightening this bolt the angular relation of the pole to the earth-working implements of each group may be fixed as desired. Another method of fixing the pole in adjusted position is illustrated in Figure 3 in which the bracket member 10' is shown as provided with a toothed face 15 for operative engagement with a similar reversely positioned face (not shown) on the pole. The particular form of means for fixing the pole in the desired angular relation, however, is immaterial to this invention.

At 20 is shown a yoke member or bar through each end of which are formed holes 21 of sufficient size to permit the poles 11 to pass through any one of them with capability of rocking axially therein. The yoke bar 20 is placed in position on the poles 11 so as to space the bars 1 in any desired relation, the particular holes 21 to be employed depending on the spacing required to best suit the particular crop being grown on the ground which it is desired to work by this mechanism. The yoke 20 is preferably pushed back adjacent to the bars 1 and is normally held there by its weight, the poles 11 extending upwardly from the bars 1 when they are grasped by the operator who draws the mechanism over the ground. The angular adjustment of these poles is provided not only to suit the height of the individual operator, but also to determine the angular position with which the implements 6 engage the ground, this angular relation determining to a large extent the character of their action thereon, for example, when cultivator teeth are used, to determine to a large extent the depth to which they penetrate the ground.

As the angularity adjustment may be insufficient to wholly effect the desired action of the implements, particularly where the ground is hard, weights may be applied to produce the desired result. These weights may be positioned as shown in Figure 1 at 25 where they are shown as provided with perforations through which the poles 11 may be threaded, the weights resting against the forward face of the yoke 20 and therefore in close proximity to the bars 1. Various sizes of weights may be employed, if desired, and one or more may be placed in position on the poles as may be found desirable.

The yoke 20 is preferably arched upwardly so as to clear the tops of the rows of the crop. When it is desired to operate where the crop is planted in rows close together, the earth working implements of each bar may be placed so as to clear the rows, or one or more of the implements may be omitted. For example, in the device shown, the middle implement 6' may be omitted to permit working where the rows are spaced so as to pass within the space formed by the omission of the implement 6' and between the adjacent ends of the bars 1. Various other spacings and special adaptations of this mechanism to conditions met with in operation will readily suggest themselves to the operator.

It is thus seen that a very flexible mechanism has been provided which may be adapted to suit various conditions, and that since the mechanism is designed to be drawn instead of pushed, it is easy to steer it so as to avoid injury to the crops. As the bars 1 are allowed to tilt independently of each other, due to the axial rocking permitted the poles 11 within the perforations 21, each group of implements carried by one of the bars may adapt itself to the configuration of the ground independently of the other.

Having thus described an embodiment of this invention it should be evident to those skilled in the art that many changes and modifications might be made therein without departing from the spirit or scope of the invention as defined by the appended claims.

I claim:

1. A device of the class described comprising a pair of bars, a pole fixed at its rear end to each bar, a spacing member having holes through which said poles pass with capability of axial rocking therein for holding said bars in spaced relation, and earth-working implements carried by each of said bars.

2. A device of the class described comprising a pair of bars, earth-working implements adjustably spaced along said bars, a pole extending perpendicularly to each bar and adjustably fixed thereto to vary its angle relative to said implements, a yoke member adjacent to said bars having a series of holes adjacent to each end through any selected one of which each pole may extend to adjustably space said bars, said poles being axially rockable to permit each bar to conform to the angle of the ground independently of the other bar, and weights carried by said poles adjacent to said yoke member.

3. A device of the class described comprising a pair of bars angular in cross section, one flange of each bar having longitudinal slots therethrough, a series of earth-working implements engaging in said slots and adjustable therealong to permit variable spacing, a pole fixed substantially centrally to the other flange of each bar substantially perpendicular to the length thereof and angularly adjustable relative to said implements, a yoke member having a series of holes therethrough adjacent to each end to selectively receive a pole therethrough with capability of axial rocking and arranged to be positioned adjacent to said bars to determine their relative spacing, and weights having holes therethrough for the passage of said poles and constructed to be positioned adjacent to said yoke member.

In testimony whereof I have affixed my signature.

CHARLES F. PERHAM.